3,018,278
THREE-COMPONENT CATALYST CONTAINING POLYMERIC METHYL HALIDE-METAL REACTION PRODUCT AND TITANIUM COMPOUND FOR OLEFIN POLYMERIZATION

Newton H. Shearer, Jr., and Harry W. Coover, Jr., Kingsport, Tenn., assignors to Eastman Kodak Company, Rochester, N.Y., a corporation of New Jersey
No Drawing. Filed Mar. 31, 1958, Ser. No. 724,919
11 Claims. (Cl. 260—93.7)

This invention relates to a new and improved polymerization process and is particularly concerned with the use of a novel catalyst combination for preparing high molecular weight solid polyolefins, such as polypropylene, of high density and crystallinity. In a particular aspect the invention is concerned with the preparation of polypropylene and higher polyolefins using a particular catalyst combination which has unexpected catalytic activity and which gives products characterized by unusually high crystallinity, softening point, thermal stability, stiffness and being substantially free of non-crystalline polymers.

Polyethylene has heretofore been prepared by high pressure processes to give relatively flexible polymers having a rather high degree of chain branching and a density considerably lower than the theoretical density. Thus, pressures of the order of 500 atmospheres or more and usually of the order of 1000–1500 atmospheres are commonly employed. It has been found that more dense polyethylenes can be produced by certain catalyst combinations to give polymers which have very little chain branching and a high degree of crystallinity. The exact reason why certain catalyst combinations give these highly dense and highly crystalline polymers is not readily understood. Furthermore, the activity of the catalysts ordinarily depends upon certain specific catalyst combinations, and the results are ordinarily highly unpredictable, since relatively minor changes in the catalyst combination often lead to liquid polymers rather than the desired solid polymers.

This application is a continuation-in-part of our copending application, Serial No. 549,868, filed November 29, 1955. In that application we have described the polymerization of α-olefinic hydrocarbons in the presence of a catalyst containing a titanium compound and the polymeric reaction product of a methylene halide with a metal from the group consisting of aluminum, zinc and magnesium. Such catalysts are quite effective for polymerizing ethylene to form a solid crystalline product. However, when such catalysts are used to polymerize propylene and higher α-olefinic hydrocarbons, the product is predominantly polymeric oils and rubbers with a comparatively small amount of high molecular weight, crystalline product. These facts indicate that one cannot predict whether a specific catalyst combination will be effective to produce crystalline, high density polymers with specific α-olefins and that, when a crystalline product is desired, the above catalysts are inadequate for polymerizing propylene and higher α-olefins.

This invention is concerned with and has for an object the provision of improved processes whereby α-monoolefins and particularly propylene and higher α-olefins can be readily polymerized by catalytic means to give high molecular weight, highly crystalline polymers. A particular object of the invention is to provide a catalyst combination which has unexpected catalytic activity for the polymerization of α-monoolefins to form crystalline high density polymers. Other objects will be apparent from the description and claims which follow.

These and other objects which will be apparent from the description and claims which follow are attained by means of the process embodying the present invention wherein α-monoolefins, either singly or in admixture, are readily polymerized to high molecular weight solid crystalline polymers by effecting the polymerization in the presence of a catalytic mixture of a titanium compound, a nondistillable polymeric reaction product resulting from reaction of a methylene halide with a metal from the group consisting of aluminum, zinc and magnesium, and a third component as defined herein. The titanium compound employed is desirably a titanium tetrahalide or a titanium tetraalkoxide but can be other well-known titanium compounds such as a titanium oxide or mixture of oxides. The polymeric reaction product forming the other component of the catalyst mixture is the product obtained by reacting a methylene halide, such as methylene bromide or chloride, with aluminum, magnesium, or zinc, and is a complex material of polymeric nature whose structure is not readily definable. The polymeric reaction product of a methylene halide and aluminum is preferred, although the other materials defined can be used with somewhat less advantageous results. Particularly good results are obtained using a titanium tetrachloride, tetrabromide or tetraalkoxide wherein each alkoxide group contains 1–4 carbon atoms, and a polymeric reaction product of methylene bromide or methylene chloride with aluminum. The polymeric reaction products obtained in this manner by substituting magnesium for aluminum also gave excellent results approaching those obtained with the aluminum compounds whereas the zinc complexes are less preferably used but gave high effective results in many cases. The third component of the catalyst is selected from the compounds having the formulas:

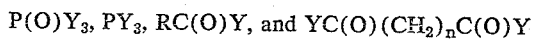

wherein each Y is an alkylamino (—NR$_2$) or alkoxy (—OR), said R being an alkyl radical containing 1 to 8 carbon atoms, preferably 1 to 4 and wherein $n$ is an integer of 1 to 4. The catalytic activity of this mixture was wholly unexpected, particularly since the mixture, in the absence of the third component, produces large amounts of oils and rubbers when propylene and higher α-monoolefins are polymerized, and the third component is not a known polymerization catalyst. The inventive process is carried out in liquid phase in an inert organic liquid and preferably an inert liquid hydrocarbon vehicle, but the process can be carried out in the absence of a diluent. The process proceeds with excellent results over a temperature range of from 0° C. to 250° C. although it is preferred to operate within the range of from about 50° C to about 150° C. Likewise, the reaction pressures may be varied widely from about atmospheric pressure to very high pressures of the order of 20,000 p.s.i. or higher. A particular advantage of the invention is that pressures of the order of 30–1000 p.s.i. give excellent results, and it is not necessary to employ the extremely high pressures which were necessary heretofore. The liquid vehicle employed is desirably one which serves as an inert liquid reaction medium.

The invention is of particular importance in the preparation of highly crystalline polypropylene, the polybutenes and polystyrene although it can be used for polymerizing mixtures of ethylene and propylene as well as other α-monoolefins containing up to 10 carbon atoms. The polypropylene produced has a softening point above 155° C. and a density of 0.91 and higher. Usually the density of the polypropylene is of the order of 0.91 to 0.92.

The polyolefins prepared in accordance with the invention can be molded or extruded and can be used to form plates, sheets, films, or a variety of molded objects which exhibit a higher degree of stiffness than do the corresponding high pressure polyolefins. The products can be extruded in the form of pipe or tubing of excellent rigidity and can be injection molded into a great variety of articles. The polymers can also be cold drawn into ribbons, bands, fibers or filaments of high elasticity and rigidity. Fibers of high strength can be spun from the molten polyolefins obtained according to this process.

The improved results obtained in accordance with the invention depend upon the particular combination of catalyst materials defined herein. The polymeric reaction products for the catalyst are readily prepared by reacting methylene bromide, methylene chloride, or the like with the desired aluminum, magnesium or zinc in the form of granules, turnings, or powder. The reaction proceeds readily with the evolution of heat to form nondistillable polymeric solids. In some cases, it is desirable to initiate the reaction by the addition of a crystal of iodine or preferably by the addition of a small amount of previously prepared polymeric reaction product. In some cases, it also assists the reaction to heat it initially on a steam bath. During the course of the reaction, it is usually desirable to control the heat of reaction by cooling the reaction mixture. When the evolution of heat has ceased, the reaction mixture can be refluxed to ensure completion. The nondistillable polymeric reaction product solidifies on cooling and can be used directly as catalyst for the polymerizations embodying the invention. The polymeric reaction product must be protected from atmospheric oxygen and moisture before and during use. The exact nature of the polymeric reaction products is not readily understood, and the invention will not be limited by any attempt to define the exact composition. The catalyst combination also contains one or more titanium compounds. Titanium tetrachloride and tetrabromide are preferably employed, although excellent results are obtained with the titanium tetraalkoxides containing 1–4 carbon atoms in each alkoxide group, such as titanium tetrabutoxide, titanium tetramethoxide, titanium tetraethoxide and the like. Good results are also obtained using such other titanium compounds as titanium dioxide, titanium sesquioxide, and mixtures thereof. The third component of the catalyst composition is a compound having the formula

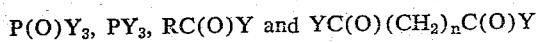

Each Y represents a lower alkylamino or lower alkoxy radical, R is a lower alkyl radical containing 1 to 8, preferably 1 to 4 carbon atoms and $n$ is an integer of 1 to 4. The catalyst compositions of this invention, when reacted with water, do not produce hydrogen.

Among the specific compounds that can be used are tris-N,N-dimethyl phosphoramide, triethyl phosphate, mixed phosphate ester-amides, triethyl phosphite, N,N-dimethylacetamide, adipamide and the like.

The limiting factor in the temperature of the process appears to be the decomposition temperature of the catalyst. Ordinarily temperatures from 50° C. to 150° C. are employed, although temperatures as low as 0° C. or as high as 250° C. can be employed if desired. Usually, it is not desirable or economical to effect the polymerization at temperatures below 0° C., and the process can be readily controlled at room temperature or higher which is an advantage from the standpoint of commercial processing. The pressure employed is usually only sufficient to maintain the reaction mixture in liquid form during the polymerization, although higher pressures can be used if desired. The pressure is ordinarily achieved by pressuring the system with the monomer whereby additional monomer dissolves in the reaction vehicle as the polymerization progresses.

The polymerization embodying the invention can be carried out batchwise or in a continuous flowing stream process. The continuous processes are preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone at an equivalent rate, whereby the relative concentration of the various components in the polymerization zone remains substantially unchanged during the process. This results in formation of polymers of extremely uniform molecular weight distribution over a relatively narrow range. Such uniform polymers possess distinct advantages since they do not contain any substantial amount of the low molecular weight or high molecular weight formations which are ordinarily found in polymers prepared by batch reactions.

In the continous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 30 to 1000 p.s.i. obtained by pressuring the system with the monomer being polymerized. The amount of vehicle employed can be varied over rather wide limits with relation to the monomer and catalyst mixture. Best results are obtained using a concentration of catalyst of from about 0.1% to about 2% by weight based on the weight of the vehicle. The concentration of the monomer in the vehicle will vary rather widely depending upon the reaction conditions and will usually range from about 2 to 50% by weight. For a solution type of process it is preferred to use a concentration from about 2 to about 10% by weight based on the weight of the vehicle, and for a slurry type of process higher concentrations, for example, up to 40% and higher are preferred. Higher concentrations of monomer ordinarily increase the rate of polymerization, but concentrations above 5–10% by weight in a solution are ordinarily less desirable because the polymer dissolved in the reaction medium results in a very viscous solution.

In preparing the polymeric reaction products for the catalyst, the ratio of methylene halide to aluminum, zinc or magnesium can be varied widely, although the metal is ordinarily employed in molar excess to ensure completion of the reaction. Any unused metal can be readily separated from the molten polymeric reaction product. The molar ratio of polymeric organo metallic reaction product to titanium compound can be varied rather widely within the range of from 1:4 to 16:1. Excellent results are obtained with approximately equal weights of the two components of the catalyst mixture or with a slight excess by weight of the titanium compound. The third component of the catalyst is preferably used in an amount within the range of 0.1 to 1 mole. The polymerization time can be varied as desired and will usually be of the order of from 30 minutes to several hours in batch processes. Contact times of from 1 to 4 hours are commonly employed in autoclave type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert.

The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well-known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the tempearture is desirably controlled within a relatively narrow range. This is readily accomplished since the solvent vehicle forms a high percentage of the polymerization mixture and hence can be heated or cooled to maintain the temperature as desired.

The diluents employed in practicing this invention can be advantageously purified prior to use in the polymerization reaction by contacting the diluent, for example, in a distillation procedure or otherwise, with the polymerization catalyst to remove undesirable trace impurities. Also, prior to such purification of the diluent the catalyst can be contacted advantageously with a polymerizable α-monoolefin.

Thus, by means of this invention polyolefins such as polypropylene, the polybutenes, polystyrene, and the like are readily produced using a catalyst combination which, based on the knowledge of the art, would not be expected to produce the results obtained. The polymers thus obtained can be extruded, mechanically milled, cast or molded as desired. The polymers can be used as blending agents with the relatively more flexible high pressure polyethylenes to give any desired combination of properties. The polymers can also be blended with antioxidants, stabilizers, plasticizers, fillers, pigments, and the like, or mixed with other polymeric materials, waxes and the like. In general, aside from the relatively higher values for such properties as softening point, density, stiffness and the like, the polymers embodying this invention can be treated in similar manner to those obtained by other processes.

From the detailed disclosure of this invention it is quite apparent that in this polymerization procedure a novel catalyst, not suggested in prior art polymerization procedures, is employed. As a result of the use of this novel catalyst it is possible to produce polymeric hydrocarbons, particularly polypropylene, having properties not heretofore obtainable. For example, polypropylene prepared in the presence of catalyst combinations within the scope of this invention is substantially free of rubbery and oily polymers and thus it is not necessary to subject such polypropylene of this invention to extraction procedures in order to obtain a commercial product. Also polypropylene produced in accordance with this invention possesses unexpectedly high crystallinity, an unusually high softening point and outstanding thermal stability. Such polypropylene also has a very high stiffness as a result of the unexpectedly high crystallinity. The properties imparted to polypropylene prepared in accordance with this invention thus characterize and distinguish this polypropylene from polymers prepared by prior art polymerization procedures.

The novel catalysts defined above can be used to produce high molecular weight crystalline polymeric hydrocarbons. The molecular weight of the polymers can be varied over a wide range by introducing hydrogen to the polymerization reaction. Such hydrogen can be introduced separately or in admixture with the olefin monomer. The polymers produced in accordance with this invention can be separated from polymerization catalyst by suitable extraction procedures, for example, by washing with water or lower aliphatic alcohols such as methanol.

The catalyst compositions have been described above as being effective primarily for the poymerization of α-monoolefins. These catalyst compositions can, however, be used for polymerizing other α-olefins, and it is not necessary to limit the process of the invention to monoolefins. Other α-olefins that can be used are butadiene, isoprene, 1,3-pentadiene and the like.

The following examples are illustrative of this invention.

Example 1

In a nitrogen-filled dry box 2 g. of catalyst was added to a 500-ml. pressure bottle containing 100 ml. of dry heptane. The catalyst was made up of the polymeric methylene chloride-aluminum reaction product and titanium tetrachloride in a molar ratio of 1:1. The pressure bottle was then attached to a propylene source and the reaction mixture was agitated at 55° C. under 30 p.s.i. of propylene pressure for 6 hours. No solid polypropylene was produced, although 31.5 g. of oil was isolated. This oil was shown by gas chromatography to consist largely of dimer, trimer, and tetramer of propylene. This demonstrates the ineffectiveness of this catalyst as a means for polymerizing propylene to a solid crystalline polymer.

Example 2

The procedure described in Example 1 was followed using 2 g. of a catalyst made up of polymeric methylene chloride-aluminum polymeric reaction product, titanium tetrachloride and tris-N,N-dimethyl phosphoramide in a molar ratio of 1:1:0.5. During the 6-hr. period of agitation of the reaction mixture at 55° C. under 30 p.s.i. propylene pressure, there was formed 10.8 g. of highly crystalline polypropylene having a density of 0.919 and an inherent viscosity of 3.33 in tetralin at 145° C. The polymer was readily molded into a hard, clear button having a softening point of 160–165° C. When polymeric methylene chloride-aluminum reaction product in the above catalyst formulation was replaced by polymeric methylene chloride-zinc reaction product, an equally efficient catalyst was formed, and under similar conditions the use of this catalyst resulted in the production of 11.5 g. of highly crystalline polypropylene.

Example 3

In a nitrogen-filled dry box a 500-ml. pressure bottle was loaded with 100 ml. of dry heptane and 2 g. of a catalyst made up of polymeric methylene chloride-aluminum reaction product and titanium tetrabutoxide in a 16:1 molar ratio. The pressure bottle was then attached to a propylene source and the reaction mixture was agitated at 70° C. and under 30 p.s.i. of propylene pressure for 6 hours. No solid propylene polymer was obtained. However, 54 g. of liquid, low-molecular weight polymers were formed. Analysis by gas chromatography indicated that this product contained propylene dimers, trimers, and tetramers.

Example 4

The process of Example 3 was followed using a 2 g. catalyst charge containing polymeric methylene chloride-aluminum reaction product, titanium tetrabutoxide, and tris-N,N-dimethyl phosphoramide in a 16:1:1 molar ratio. A 9.1 g. yield of solid polypropylene was produced. The solid polymer was extracted with butyl ether to remove a small quantity of rubbery polypropylene and then extracted with heptane to remove the low-molecular weight, crystalline polypropylene. The residual 7.5 g. of polypropylene was highly crystalline: density 0.917, inherent viscosity 2.41 and softening point 159–164° C.

Example 5

Inside a nitrogen-filled dry box a 280 ml. stainless steel autoclave was loaded with 0.75 g. of a catalyst having a 1:4:0.1 molar ratio of polymeric methylene chloride-aluminum reaction product, titanium tetrabutoxide and tris-N,N-dimethyl phosphoramide. The autoclave was sealed, placed in a rocker and 100 ml. (51 g.) of propylene was added. Rocking was initiated and the mixture was heated to 85° C. for 4 hours. A yield of 31.0 g. of highly crystalline polypropylene was obained having a density of 0.918 and an inherent viscosity of 2.91. Mixed amide esters such as $C_2H_5OP(O)(NR_2)_2$, triethyl phosphate, triethyl phosphite, N,N-dimethylacetamide and adipamide, when used in place of the above phosphoramide produce desirable yields of highly crystalline polypropylene.

*Example 6*

The process of Example 5 was followed using 3-methyl-1-butene as the monomer and using a total of 0.1 g. of catalyst at a polymerization temperature of 150° C. A 9.6 g. yield of highly crystalline poly-3-methyl-1-butene was obtained. Good yields of highly crystalline polymer were also obtained using 4-methyl-1-pentene, 1-butene, 1-pentene, vinylcyclohexane, styrene and fluorostyrene as monomers.

We claim:

1. In the polymerization of α-olefinic hydrocarbon material to form solid, crystalline polymer, the improvement which comprises polymerizing said α-olefinic hydrocarbon material with a catalytic mixture containing (1) a polymer made by reaction of a methylene halide with a metal selected from the group consisting of aluminum, zinc and magnesium, (2) a titanium compound selected from the group consisting of titanium halides, titanium alkoxides and titanium oxides, and (3) an organo-phosphorus compound selected from the group consisting of lower-alkyl phosphites, lower-alkyl phosphates and hexa-lower alkyl phosphoramides, the molar ratio of components (1) and (2) in said catalytic mixture being within the range of 1:4 to 16:1 and said catalytic mixture containing from 0.1 to 1 mole of said organophosphorus compound.

2. In the polymerization of propylene to form solid crystalline polymer, the improvement which comprises polymerizing said propylene with a catalytic mixture containing (1) a polymer made by reaction of a methylene halide with a metal selected from the group consisting of aluminum, zinc and magnesium, (2) a titanium compound selected from the group consisting of titanium halides, titanium alkoxide and titanium oxides, and (3) an organophosphorus compound selected from the group consisting of lower-alkyl phosphites, lower-alkyl phosphates, and hexa-lower alkyl phosphoramides, the molar ratio of components (1) and (2) in said catalytic mixture being within the range of 1:4 to 16:1 and said catalytic mixture containing from 0.1 to 1 mole of said organophosphorus compound.

3. In the polymerization of propylene to form solid, crystalline polymer, the improvement which comprises polymerizing said propylene in liquid dispersion in an inert organic liquid and in the presence of a catalytic mixture of (1) a polymer made by the reaction of a methylene halide and aluminum, (2) a titanium halide and (3) an organophosphorus compound selected from the group consisting of lower-alkyl phosphites, lower-alkyl phosphates and hexa-lower alkyl phosphoramides, the molar ratio of components (1) and (2) in said catalytic mixture being within the range of 1:4 to 16:1 and said catalytic mixture containing from 0.1 to 1 mole of said organophosphorus compound.

4. In the polymerization of propylene to form solid, crystalline polymer, the improvement which comprises polymerizing said propylene in liquid dispersion in an inert organic liquid and in the presence of a catalytic mixture of (1) a polymer made by reaction of methylene chloride and aluminum, (2) titanium tetrachloride and (3) tris-N,N-dimethyl phosphoramide, the molar ratio of components (1) and (2) in said catalytic mixture being within the range of 1:4 to 16:1 and said catalytic mixture containing from 0.1 to 1 mole of said organophosphorus compound.

5. In the polymerization of propylene to form solid, crystalline polymer, the improvement which comprises polymerizing said propylene in liquid dispersion in an inert organic liquid and in the presence of a catalytic mixture of (1) a polymer made by reaction of methylene with aluminum, (2) a titanium tetraalkoxide wherein the alkoxide radicals contain from 1 to 4 carbon atoms and (3) tris-N,N-dimethyl phosphoramide, the molar ratio of components (1) and (2) in said catalytic mixture being within the range of 1:4 to 16:1 and said catalytic mixture containing from 0.1 to 1 mole of said organophosphorus compound.

6. In the polymerization of propylene to form solid, crystalline polymer, the improvement which comprises polymerizing said propylene in liquid dispersion in an inert organic liquid and in the presence of a catalytic mixture of (1) a polymer made by reaction of methylene chloride with aluminum, (2) a titanium tetrabutoxide and (3) tris-N,N-dimethyl phosphoramide, the molar ratio of components (1) and (2) in said catalytic mixture being within the range of 1:4 to 16:1 and said catalytic mixture containing from 0.1 to 1 mole of said organophosphorus compound.

7. As a composition of matter, a polymerization catalyst containing (1) a polymer made by reaction of a methylene halide with a metal selected from the group consisting of auminum, zinc and magnesium, (2) a titanium compound selected from the group consisting of titanium halides, titanium alkoxides and titanium oxides, and (3) an organophosphorus compound selected from the group consisting of lower-alkyl phosphites, lower-alkyl phosphates and hexa-lower alkyl phosphoramides, the molar ratio of components (1) and (2) in said catalytic mixture being within the range of 1:4 to 16:1 and said catalytic mixture containing from 0.1 to 1 mole of said organophosphorus compound.

8. As a composition of matter, a polymerization catalyst containing (1) a polymer made by the reaction of a methylene halide and aluminum, (2) a titanium halide and (3) an organophosphorus compound selected from the group consisting of lower-alkyl phosphites, lower-alkyl phosphates and hexa-lower alkyl phosphoramides, the molar ratio of components (1) and (2) in said catalytic mixture being within the range of 1:4 to 16:1 and said catalytic mixture containing from 0.1 to 1 mole of said organophosphorus compound.

9. As a composition of matter, a polymerization catalyst containing (1) a polymer made by reaction of methylene chloride with aluminum, (2) titanium tetrachloride and (3) tris-N,N-dimethyl phosphoramide, the molar ratio of components (1) and (2) in said catalytic mixture being within the range of 1:4 to 16:1 and said catalytic mixture containing from 0.1 to 1 mole of said organophosphorus compound.

10. As a composition of matter, a polymerization catalyst containing (1) a polymer made by reaction of methylene chloride with aluminum, (2) a titanium tetraalkoxide wherein the alkoxide radicals contain from 1 to 4 carbon atoms and (3) tris-N,N-dimethyl phosphoramide, the molar ratio of components (1) and (2) in said catalytic mixture being within the range of 1:4 to 16:1 and said catalytic mixture containing from 0.1 to 1 mole of said organophosphorus compound.

11. As a composition of matter, a polymerization catalyst containing (1) a polymer made by reaction of methylene chloride wtih aluminum, (2) a titanium tetrabutoxide and (3) tris-N,N-dimethyl phosphoramide, the molar ratio of components (1) and (2) in said catalytic mixture being within the range of 1:4 to 16:1 and said catalytic mixture containing from 0.1 to 1 mole of said organophosphorus compound.

(References on following page)

References Cited in the file of this patent

UNITED STATES PATENTS

| | | |
|---|---|---|
| 2,832,759 | Nowlin et al. | Apr. 29, 1958 |
| 2,839,474 | Johnson et al. | June 17, 1958 |
| 2,840,617 | Shokal | June 24, 1958 |
| 2,846,427 | Findlay | Aug. 5, 1958 |

FOREIGN PATENTS

| | | |
|---|---|---|
| 781,837 | Great Britain | Aug. 28, 1957 |

OTHER REFERENCES

"The Chemistry of Organometallic Compounds" (Rochow), published by John Wiley & Sons, Inc. (London), 1957 (page 135 relied on).